United States Patent
Murgia et al.

(10) Patent No.: US 7,711,107 B1
(45) Date of Patent: May 4, 2010

(54) PERCEPTUAL MASKING OF RESIDUAL ECHO

(75) Inventors: Carlo Murgia, Aliso Viejo, CA (US); Jeffrey D. Klein, Irvine, CA (US); Adil Benyassine, Irvine, CA (US); Eyal Shlomot, Long Beach, CA (US); Yang Gao, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1392 days.

(21) Appl. No.: 11/129,450

(22) Filed: May 12, 2005

(51) Int. Cl.
*H04M 9/08* (2006.01)

(52) U.S. Cl. .............................. 379/406.05; 379/406.08

(58) Field of Classification Search ............... 379/3, 379/406.05, 406.01, 406.5, 406.6, 406.08, 379/406.09, 406.1–406.16
See application file for complete search history.

(56) References Cited

U.S. PATENT DOCUMENTS

| | | | | |
|---|---|---|---|---|
| 4,672,665 A | * | 6/1987 | Nagai et al. | 379/406.11 |
| 5,157,653 A | * | 10/1992 | Genter | 370/288 |
| 6,597,787 B1 | * | 7/2003 | Lindgren et al. | 379/406.05 |
| 7,027,591 B2 | * | 4/2006 | Cairns | 379/406.05 |
| 7,515,704 B2 | * | 4/2009 | Telukuntla | 379/406.14 |
| 2004/0001450 A1 | * | 1/2004 | He et al. | 370/286 |
| 2005/0147235 A1 | * | 7/2005 | Telukuntla | 379/406.01 |

* cited by examiner

*Primary Examiner*—Fan Tsang
*Assistant Examiner*—Akelaw A Teshale
(74) *Attorney, Agent, or Firm*—Farjami & Farjami LLP

(57) ABSTRACT

A method of masking a residual echo signal by an echo canceller is provided. The method comprises receiving a far-end signal, adjusting filter coefficients of an adaptive filter in response to the far-end signal, generating an echo model signal based on the far-end signal using the adaptive filter, receiving a near-end signal, subtracting the echo model signal from the near-end signal to generate an output signal, defining a spectral mask based on the near-end signal, wherein the spectral mask is indicative of near-end spectral peaks and near-end spectral valleys, de-emphasizing the output signal in spectral regions of the near-end spectral peaks, and emphasizing the output signal in spectral regions of the near-end spectral valleys, wherein the de-emphasizing occurs during filter coefficients determination for the adaptive filter. A weighted filter may perform the de-emphasizing and the emphasizing operations, where the weighted filter uses medium term spectral characteristics of the near-end signal.

11 Claims, 7 Drawing Sheets

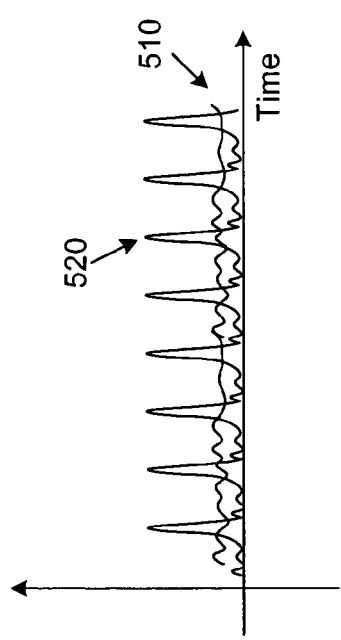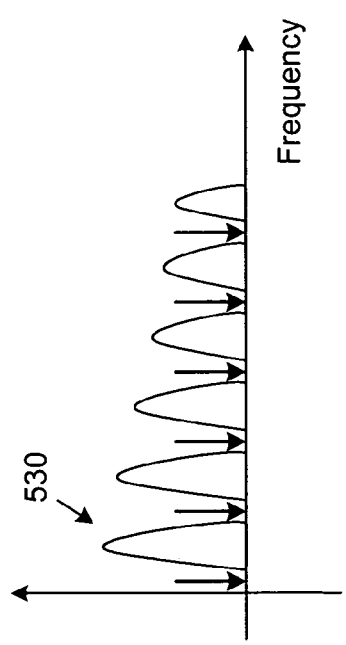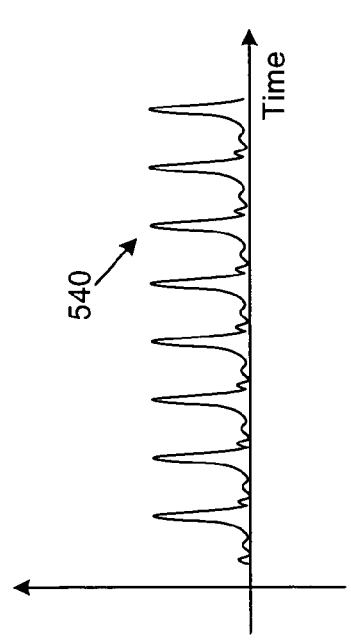

PERCEPTUAL MASKING OF RESIDUAL ECHO

BACKGROUND OF THE INVENTION

1. Field of the Invention

The present invention relates generally to echo canceller systems in communication networks. More particularly, the present invention relates to methods and systems for masking the residual echo in echo canceller systems.

2. Background Art

Subscribers use speech quality as the benchmark for assessing the overall quality of a telephone network. A key technology to provide a high quality speech is echo cancellation. Echo canceller performance in a telephone network, either a TDM or packet telephony network, has a substantial impact on the overall voice quality. An effective removal of hybrid and acoustic echo inherent in telephone networks is a key to maintaining and improving perceived voice quality during a call.

Echoes occur in telephone networks due to impedance mismatches of network elements and acoustical coupling within telephone handsets. Hybrid echo is the primary source of echo generated from the public-switched telephone network (PSTN). As shown in FIG. 1, hybrid echo 110 is created by a hybrid, which converts a four-wire physical interface into a two-wire physical interface. The hybrid reflects electrical energy back to the speaker from the four-wire physical interface. Acoustic echo, on the other hand, is generated by analog and digital telephones, with the degree of echo related to the type and quality of such telephones. As shown in FIG. 1, acoustic echo 120 is created by a voice coupling between the earpiece and microphone in the telephones, where sound from the speaker is picked by the microphone, for example, by bouncing off the walls, windows, and the like. The result of this reflection is the creation of multi-path echo, which would be heard by the speaker unless eliminated.

As shown in FIG. 1, in modern telephone networks, echo canceller 140 is typically positioned between hybrid 130 and network 150. Generally speaking, echo cancellation process involves two steps. First, as the call is set up, echo canceller 140 employs a digital adaptive filter to adapt to the far-end signal and create a model based on the far-end signal before passing through hybrid 130. After the local-end signal, including near-end signal and/or echo signal, passes through hybrid 130, echo canceller 140 subtracts the far-end model from the local-end signal to cancel hybrid echo and generate an error signal. Although this echo cancellation process removes a substantial amount of the echo, non-linear components of the echo, which are also known as residual echo, may still remain.

To cancel non-linear components of the echo, the second step of the echo cancellation process utilizes a non-linear processor (NLP) to eliminate the remaining or residual echo. As known in the art, in stationary conditions, the residual echo is similar to a white noise signal after convergence of the adaptive filter. When the near-end talker is not active, the residual echo is eliminated by applying the NLP, such that the NLP removes the original filtered signal and replaces it with a synthetic signal that mimics the spectral characteristics of the background noise by using a Comfort Noise Generator (CNG). On the other hand, when the near-end-talker is active, conventional echo cancellers generally assume that the attenuation introduced by the adaptive filter is strong enough to bring the residual echo below the auditory capability of the far-end listener. However, such assumption is not always true and such false assumption can cause undesirable results.

In conventional echo cancellers, if we define the estimated echo as:

$$e(n) = \sum_{k=0}^{L-1} Rxin(n-k) \cdot \alpha(k)$$

where $\alpha(n)$ are the EC filter coefficients at sample n and L is the length of the filter, then the EC output signal will be:

$$Txout(n) = Txin(n) - e(n)$$

With these definitions the power of the output signal will be:

$$E = \sum_{n=0}^{N-1} (Txout(n))^2 = \sum_{n=0}^{N-1} (Txin(n) - e(n))^2 = \sum_{n=0}^{N-1} \left( Txin(n) - \sum_{k=0}^{L-1} Rxin(n-k) \cdot \alpha(k) \right)^2$$

The $\alpha(n)$ coefficients are defined by finding the set of coefficients that minimize the energy E by using the decent gradient algorithm on the equation:

$$\frac{\partial E}{\partial \alpha(n)} = -\sum_{n=0}^{N-1} Rxin(n-k) \cdot (Txin(n) - e(n))$$

Therefore, as shown, conventional echo cancellers fail to distinguish between near-end talker activity when processing the residual, by making a false assumption that, when the near-end talker is active, the attenuation introduced by the adaptive filter is strong enough to bring the residual echo below the auditory capability of the far-end listener. Therefore, conventional echo cancellers merely rely upon the attenuation introduced by the adaptive filter to bring the residual echo below the auditory capability of the far-end listener.

Accordingly, there is a need in the art for echo canceller systems that can overcome the shortcoming of the conventional echo cancellers and process the residual echo properly even when the near-end talker is active.

SUMMARY OF THE INVENTION

The present invention is directed to methods and systems for exploiting the near end talker information in echo canceller systems to mask the residual echo. According to one aspect of the present invention, there is provided a method of masking a residual echo signal by an echo canceller. In one aspect, the method comprises receiving a far-end signal; adjusting filter coefficients of an adaptive filter in response to the far-end signal; generating an echo model signal based on the far-end signal using the adaptive filter; receiving a near-end signal; subtracting the echo model signal from the near-end signal to generate an output signal; defining a spectral mask based on the near-end signal, wherein the spectral mask is indicative of near-end spectral peaks and near-end spectral valleys; de-emphasizing the output signal in spectral regions of the near-end spectral peaks, wherein the de-emphasizing occurs during filter coefficients determination for the adaptive filter; and emphasizing the output signal in spectral regions of the near-end spectral valleys.

In a further aspect, the de-emphasizing and the emphasizing operations are performed by a weighted filter, where the weighted filter uses medium term spectral characteristics of the near-end signal, and an inverse of the weighted filter generates a signal that is correlated with the medium term spectral characteristics of the near-end signal, where the medium term spectral characteristics of the near-end signal are estimated in absence of echo.

In another aspect, the defining, de-emphasizing and emphasizing operations are performed as parts of a minimization process of energy (E) defined as:

$$E = \sum_{n=0}^{N-1} (w(n) * Txout(n))^2 = \sum_{n=0}^{N-1} (w(n) * Txin(n) - w(n) * e(n))^2 =$$

$$\sum_{n=0}^{N-1} \left( w(n) * Txin(n) - w(n) * \sum_{k=0}^{L-1} Rxin(n-k) \cdot \alpha(k) \right)^2$$

using a decent gradient algorithm defined as:

$$\frac{\partial E}{\partial \alpha(n)} = -\sum_{n=0}^{N-1} Rxin(n-k) \cdot (w(n) * (Txin(n) - e(n)))$$

wherein w(n) is a weighting filter.

In as separate aspect, the method further comprises applying a spectral post-processing to the output signal to decrease or remove choppiness.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein:

FIG. 5a illustrates a graph of a speech signal and a residual echo;

FIG. 5b illustrates a masking the residual echo of FIG. 5a using the echo canceller of FIG. 2;

FIG. 5c illustrates the speech signal after the masking of FIG. 5b;

DETAILED DESCRIPTION OF THE INVENTION

Figure 1:
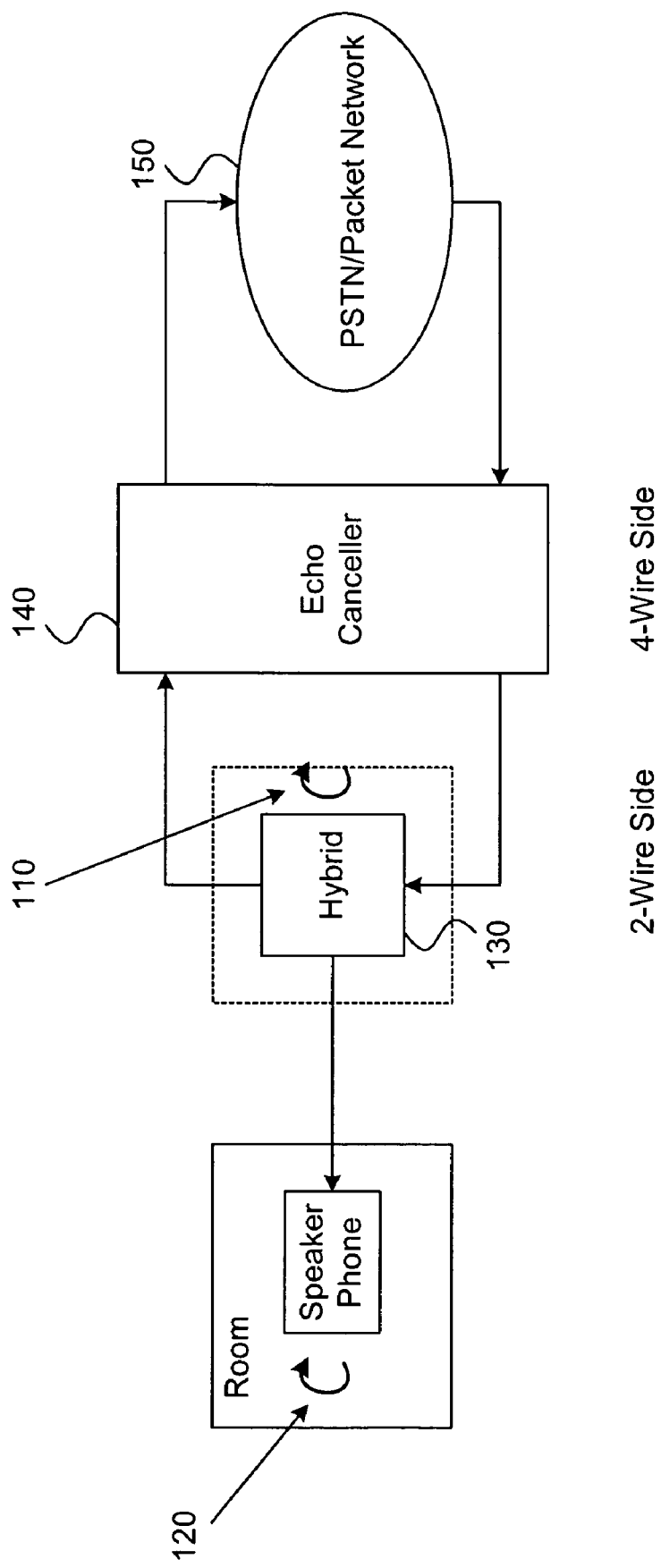
FIG. 1 illustrates a block diagram of a conventional communication system showing a placement of an echo canceller in an access network.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
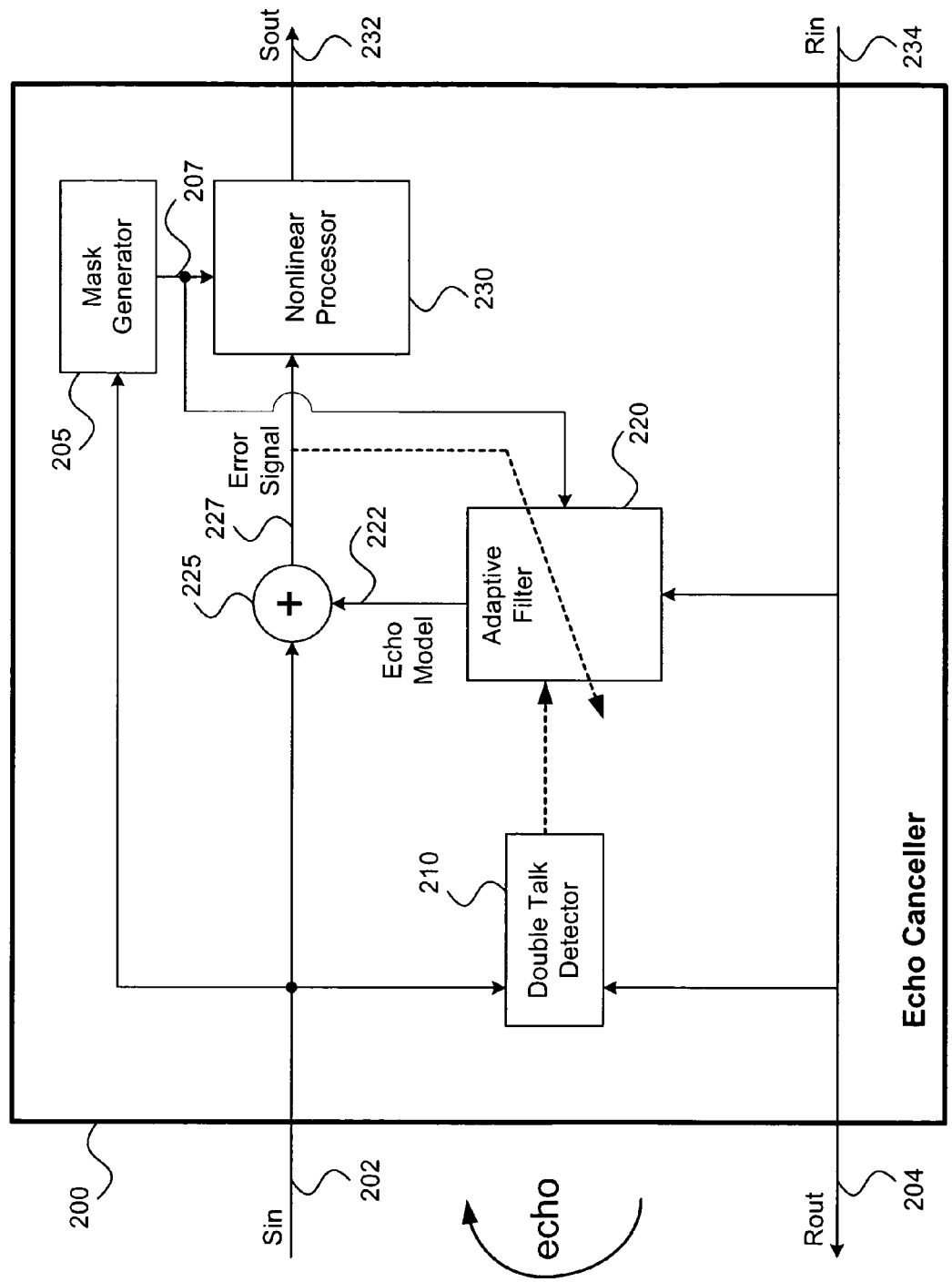
FIG. 2 illustrates a block diagram of an echo canceller, according to one embodiment of the present invention.

FIG. 2 illustrates a block diagram of echo canceller 200, according to one embodiment of the present invention. As shown, echo canceller 200 includes mask generator 205, double talk detector 210, adaptive filter 220, error estimator 225 and nonlinear processor 230. During its operation, echo canceller 200 receives Rin signal 234 from the far end, which is fed to double talk detector 210, and is passed through to the hybrid, e.g. see hybrid 130 of FIG. 1, as Rout signal 204 to the near end. As discussed above, the hybrid causes Rout signal 204 to be reflected as Sin signal 202 from the near end, which is fed to mask generator 205 and double talk detector 210.

Double talk detector 210 controls the behavior of adaptive filter 220 during periods when Sin signal 202 from the near end reaches a certain level. Because echo canceller 200 is utilized to cancel an echo of Rin signal 234 from the far end, presence of speech signal from the near end would cause adaptive filter 220 to converge on a combination of near end speech signal and Rin signal 234, which will lead to an inaccurate echo path model, i.e. incorrect adaptive filter 220 coefficients. Therefore, in order to cancel the echo signal, adaptive filter 220 should not train in the presence of the near end speech signal. To this end, echo canceller 200 must analyze the incoming signal and determine whether it is solely an echo signal of Rin signal 234 or also contains the speech of a near end talker. By convention, if two people are talking over a communication network or system, one person is referred to as the "near talker," while the other person is referred to as the "far talker." The combination of speech signals from the near end talker and the far end talker is referred to as "double talk."

To determine whether Sin signal 202 contains double talk, double talk detector 210 estimates and compares the characteristics of Rin signal 234 and Sin signal 202. A primary purpose of double talk detector is to prevent adaptive filter 220 from adaptation when double talk is detected or to adjust the degree of adaptation based on confidence level of double talk detection, which is described in U.S. Pat. No. 6,804,203, entitled "Double Talk Detector for Echo Cancellation in a Speech Communication System", which is hereby incorporated by reference in its entirety.

Echo canceller 200 utilizes adaptive filter 220 to model the echo path and its delay. In one embodiment, adaptive filter 220 uses a transversal filter with adjustable taps, where each tap receives a coefficient that specifies the magnitude of the corresponding output signal sample and each tap is spaced a sample time apart. The better the echo canceller can estimate what the echo signal will look like, the better it can eliminate the echo. To improve performance of echo canceller 200, it may be desirable to vary the adaptation rate at which the transversal filter tap coefficients of adaptive filter 220 are adjusted. For instance, if double talk detector 210 denotes a high confidence level that the incoming signal is an echo signal, it is preferable for adaptive filter 220 to adapt quickly. On the other hand, if double talk detector 210 denotes a low confidence level that the incoming signal is an echo signal, i.e. it may include double talk, it is preferable to decline to adapt at all or to adapt very slowly. If there is an error in determining whether Sin signal 202 is an echo signal, a fast adaptation of adaptive filter 220 causes rapid divergence and a failure to eliminate the echo signal.

In one embodiment, adaptive filter 220 may be represented by function h(n), which is originally reset, i.e. h(n)=0. As Rin signal 234 is received by adaptive filter 220, function h(n) grows to form an echo path model based on Rin signal 234 from the far end. In one embodiment, echo canceller 200 can be a SPARSE echo canceller, which employs adaptive filter algorithms with a dynamically positioned window to cover a desired echo tail length. In such embodiment, echo canceller 200 uses a sliding window, e.g. a 24 ms window, covering an echo path delay, e.g. a 128 ms delay. To properly cancel the echo, echo canceller 200 must determine pure delay or bulk delay, which is indicative of the location of the echo signal segment or window within the 128 ms echo path delay. A bulk delay parameter stores the location of bulk delay, which is determined by echo canceller 200 based on an analysis of the echo path delay. In another embodiment, echo canceller 200 can be a non-SPARSE echo canceller, which applies a full-length adaptive filter to cover a specific echo tail length. In such embodiment, echo canceller 200 uses full-window adaptive filter algorithms to cover the echo path delay, e.g. a 24 ms delay.

As shown in FIG. 2, adaptive filter 220 produces echo model signal 222 based on Rin signal 234 from the far end. Error estimator 225 receives Sin signal 202 and subtracts echo model signal 222 from Sin signal 202 to generate residual echo signal or error signal 227. Adaptive filter 220 also receives error signal 227 and updates its coefficients based on error signal 227.

It is known that the echo path includes nonlinear components that cannot be removed by adaptive filter 220 and, thus, after subtraction of echo model signal 222 from Sin signal 202, there remains residual echo, which must be eliminated by nonlinear processor (NLP) 230. As shown NLP 230 receives residual echo signal or error signal 227 from error estimator 225 and generates Sout 220 for transmission to far end. If error signal 227 is below a certain level, NLP 230 replaces the residual echo with either comfort noise if the comfort noise option is enabled, or with silence if the comfort noise option is disabled.

With continued reference to FIG. 2, echo canceller 200 includes mask generator 205. In stationary conditions, mask generator 205 uses medium term spectral characteristics of the near-end-talker to weight a minimization criterion described above, in such a way that the residual echo will be masked by the near end talker activity, and generates mask output signal 207. During the minimization process, a weighting filter will modify the criterion by de-emphasizing the spectral regions corresponding to the near-end spectral peaks and emphasizing the spectral regions corresponding to the near-end valleys. As a result, the near-end signal will be able to mask the weighted residual echo across the spectrum.

If we define the impulse response of the weighting filter as w(n) the minimization criterion will be modified as:

$$E = \sum_{n=0}^{N-1} (w(n) * Txout(n))^2 = \sum_{n=0}^{N-1} (w(n) * Txin(n) - w(n) * e(n))^2 = \sum_{n=0}^{N-1} \left( w(n) * Txin(n) - w(n) * \sum_{k=0}^{L-1} Rxin(n-k) \cdot \alpha(k) \right)^2$$

The energy E will be minimized by using the decent gradient algorithm on the equation:

$$\frac{\partial E}{\partial \alpha(n)} = -\sum_{n=0}^{N-1} Rxin(n-k) \cdot (w(n) * (Txin(n) - e(n)))$$

The resulting residual echo will be correlated with the medium term spectral characteristics of the near-end talker and, for this reason, it will be less perceivable by the far end listener.

The filter w(n) can be defined in different ways and it will be based on the medium term spectral characteristics of the near-end talker estimated in absence of echo. For example, this may be done by using an LPC analysis or a frequency spectral mask. For the LPC analysis, a running mean of the LPC analysis with bandwidth expansion is shown as:

$$W(z) = Z(w(n)) = \frac{\overline{A}(z/\gamma_1)}{\overline{A}(z/\gamma_2)}$$

where $\overline{A}(z)$ is the running mean with a medium term forgetting factor of the LPC analysis of the near end talker when no echo is observed.

For the frequency spectral mask, a running mean of a near-end FFT module may be used to generate the frequency mask. By applying the $FFT^{-1}$, we may obtain the auto-correlation coefficients and calculate the corresponding LPC coefficients.

If the adaptive filtering operation of echo canceller 200 is performed in the frequency domain, the weighting of the coefficients can be achieved by simple multiplication of the W(f) ($z=e^{2\pi i f}$) and the FFT of the filter coefficients. The introduction of filter w(n) will improve the masking of the residual echo.

Figure 4:
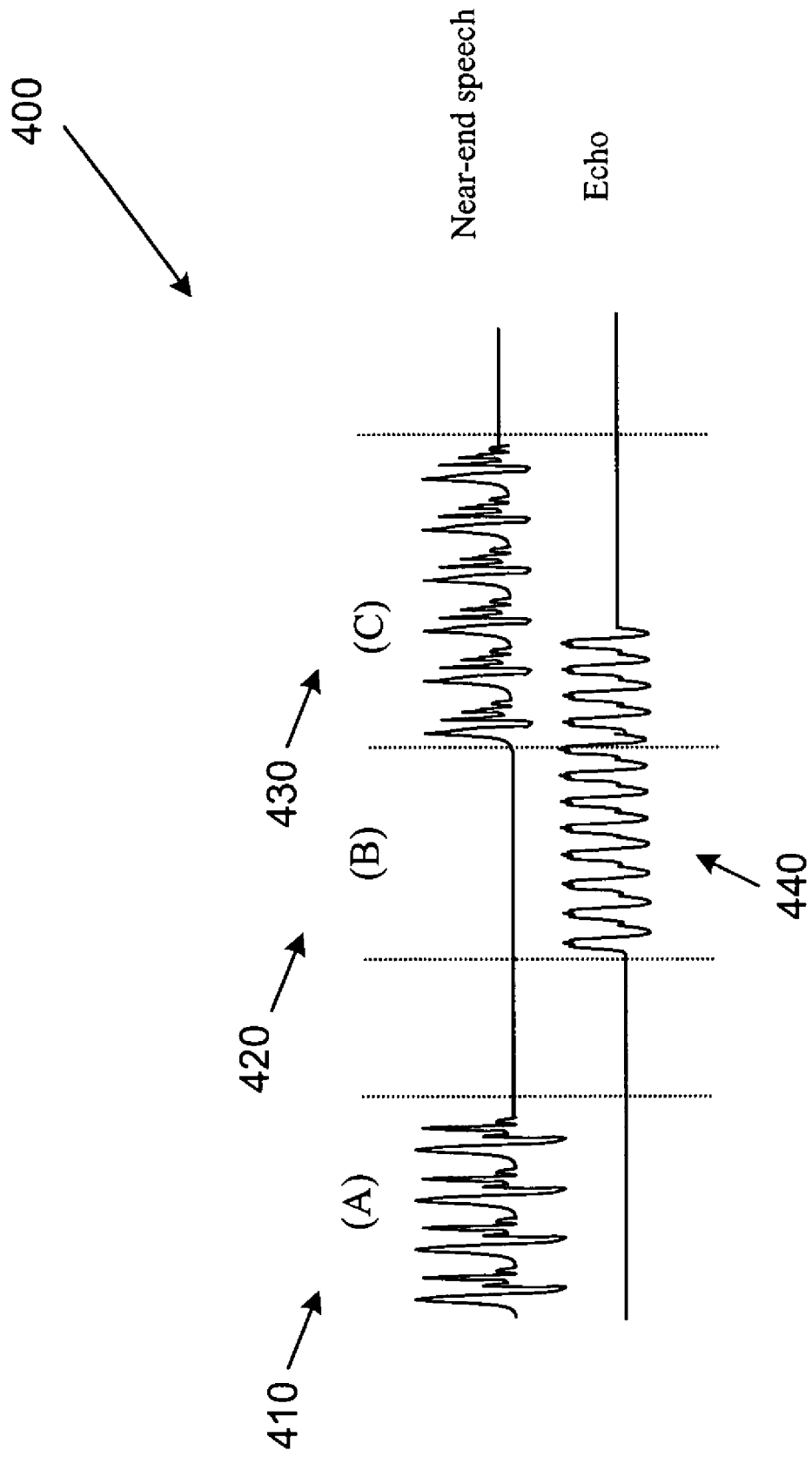
FIG. 4 illustrates a graph of an echo signal in presence of near-end speech signal.

With reference to FIG. 4, which illustrates a graph of echo signal 440 in presence of near-end speech signal, the weighting filter coefficients should be estimated during period A 410, when the far end echo is zero or near zero. Also, during period B 420, the echo canceller filter coefficients can be adapted using the w(n) estimated during period A 410 and applied during period C 430. Further, NLP 230 may compensate for any reduction in adaptive filter 220 performance during period B 420.

Figure 3:
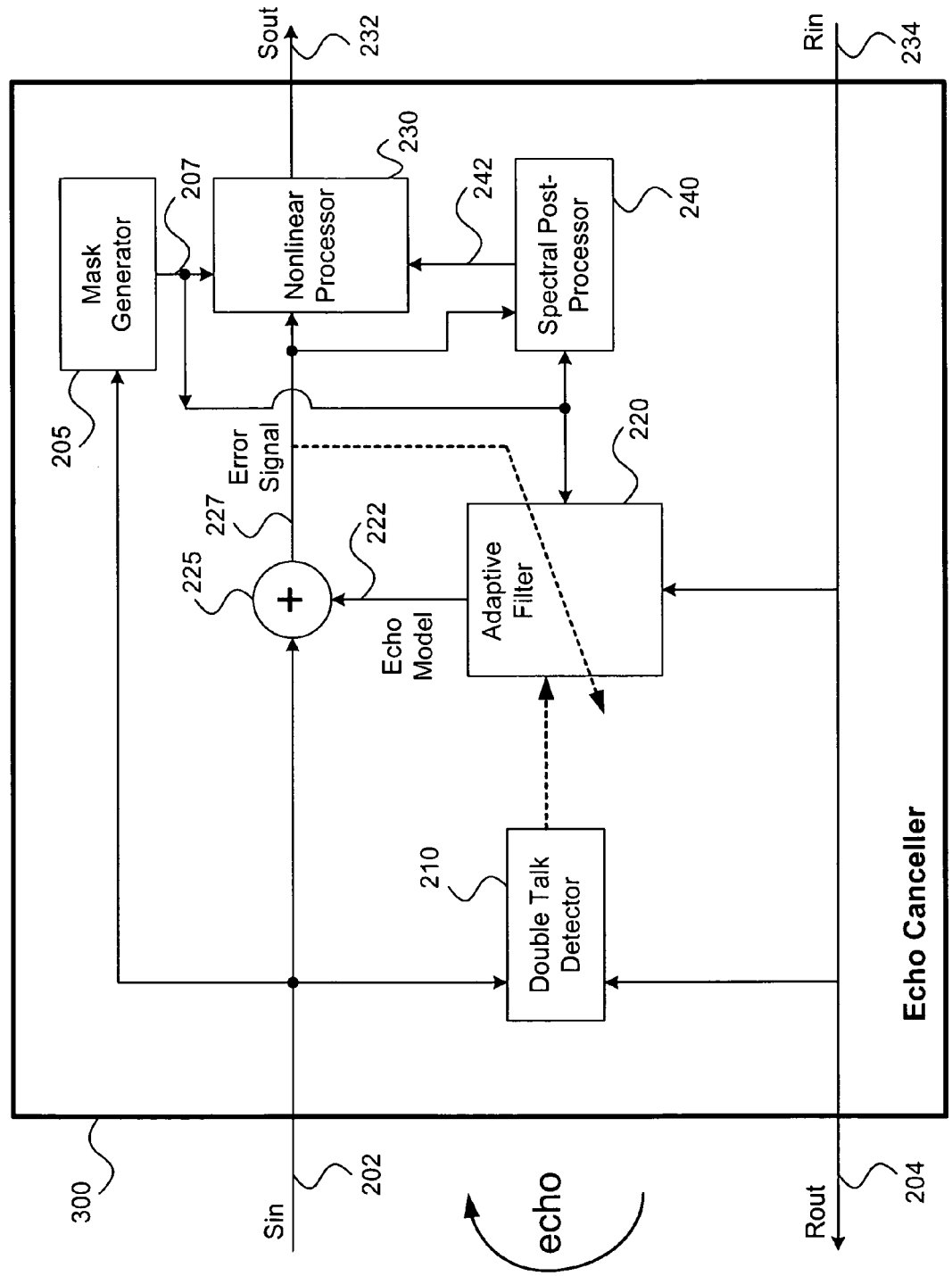
FIG. 3 illustrates a block diagram of an echo canceller, according to another embodiment of the present invention.

Turning to FIG. 3, another embodiment of the present invention is disclosed. As shown, echo canceller 300 includes elements similar to those of echo canceller 200, except that echo canceller 300 includes spectral post-processor 240 to advantageously perform a perceptual spectral post processing. As illustrated in FIG. 3, spectral post-processor 240 receives error signal 227 and mask output signal 207, and generates post-processed signal 242 to NLP 230. Echo canceller 300 achieves perceptual masking of the residual echo estimate or error signal 227 by subtracting the residual echo estimate from the filtered near end signal to prevent choppiness in Sout signal 232.

Under certain conditions, such as in stationary conditions, spectral characteristic information of the near-end talker is used to mask the residual echo or error signal 227 to remedy choppiness effects that are introduced by the CNG module of NLP 230. This approach is particularly useful for the double talking configuration, i.e. when the near-end talker and the far-end talker are speaking at the same time, which is when coefficients of adaptive filter 220 are not adapted and the residual echo power is increased.

In one embodiment, spectral post-processor 240 includes a time-to-frequency transformer, an attenuation module and a frequency-to-time transformer (not shown). Spectral post-processor 240 is similar to a spectral noise suppressor, and the residual echo can be considered a special type of background noise. Turning to FIG. 5a, input signal 520 and noise signal 510 are shown. To mask out the residual echo signal, spectral post-processor 240 converts input signal 520, including noise signal 510, from time domain to frequency domain using time-to-frequency transformer, as shown in FIG. 5b. Further, as shown in FIG. 5b, the attenuation module of spectral post-processor 240 attenuates the valley areas of spectrum 530 to remove or mask out the residual echo. Next, as shown in FIG. 5c, frequency-to-time transformer converts the attenuated signal to time domain, and generates post-processed signal 640 for use by NLP 230.

Spectral post-processing comprises two separate aspects, namely, a noise level estimation and a spectral subtraction. In one embodiment, the noise level estimation may be performed by continuously tracking the minimum spectral values of the TxFiltered (n) signal, i.e., segments 610-640 or A, B, C and D in FIG. 6. In another embodiment, however, the noise level estimation may use a VAD-based solution, where the background noise estimation can be updated when the VAD is down, i.e. segment B 620 in FIG. 6.

Figure 6:
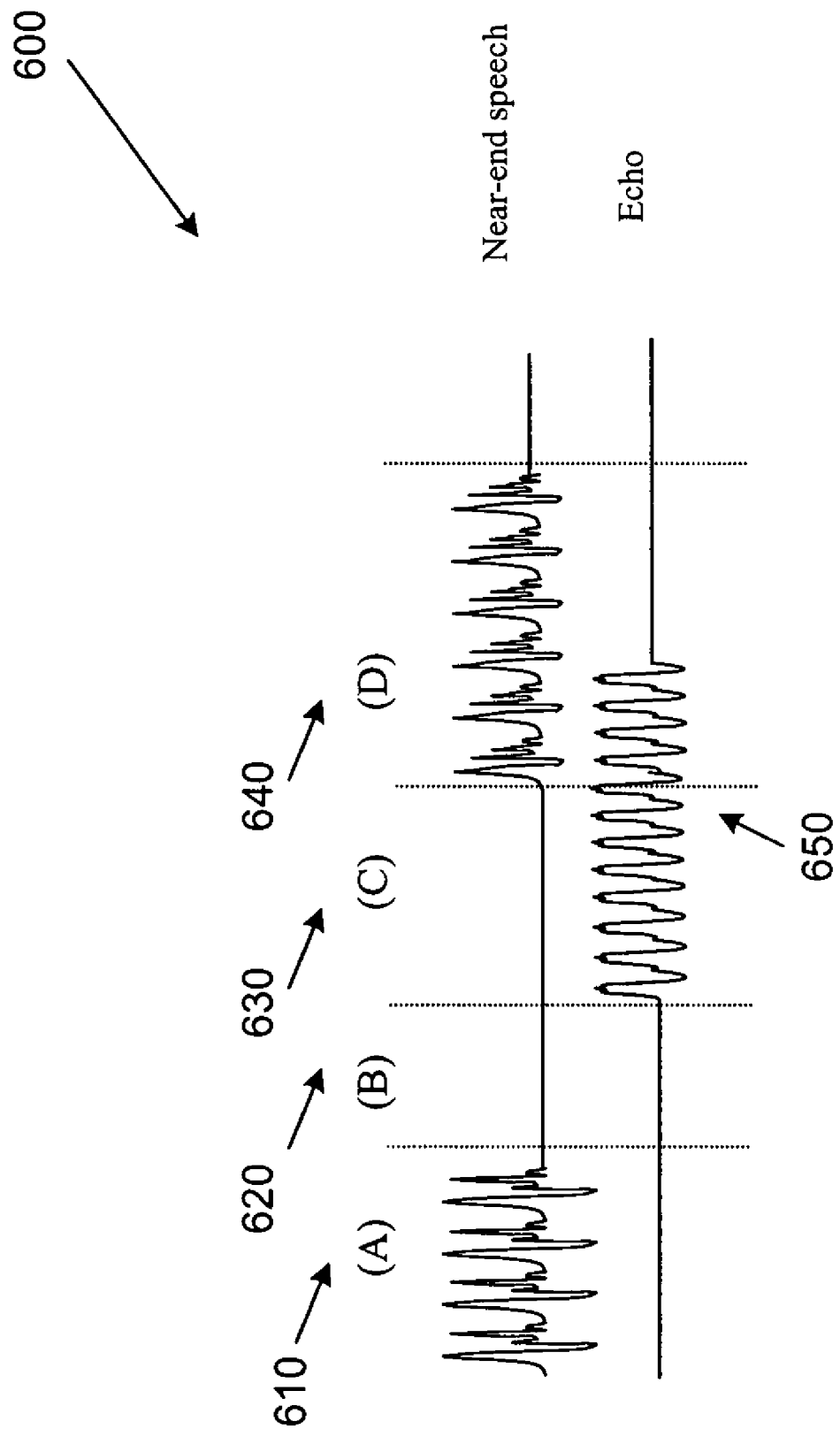
FIG. 6 illustrates a graph of an echo signal in presence of near-end speech signal.

The spectral subtraction can be performed by attenuation the inter-harmonic spectral bins of the FFT of TxFiltered (n) that correspond to the residual noise to a level below the human earring capability, and is performed during the segments when the near-end is active, i.e. segments A 610 and D 640 in FIG. 6. In one embodiment, the spectral subtraction can be performed using the harmonic modeling of the spectrum, where the harmonic components of the module of the FFT of TxFiltered (n) are replaced with a model of the harmonic located at multiple of the pitch frequency.

Figure 7:
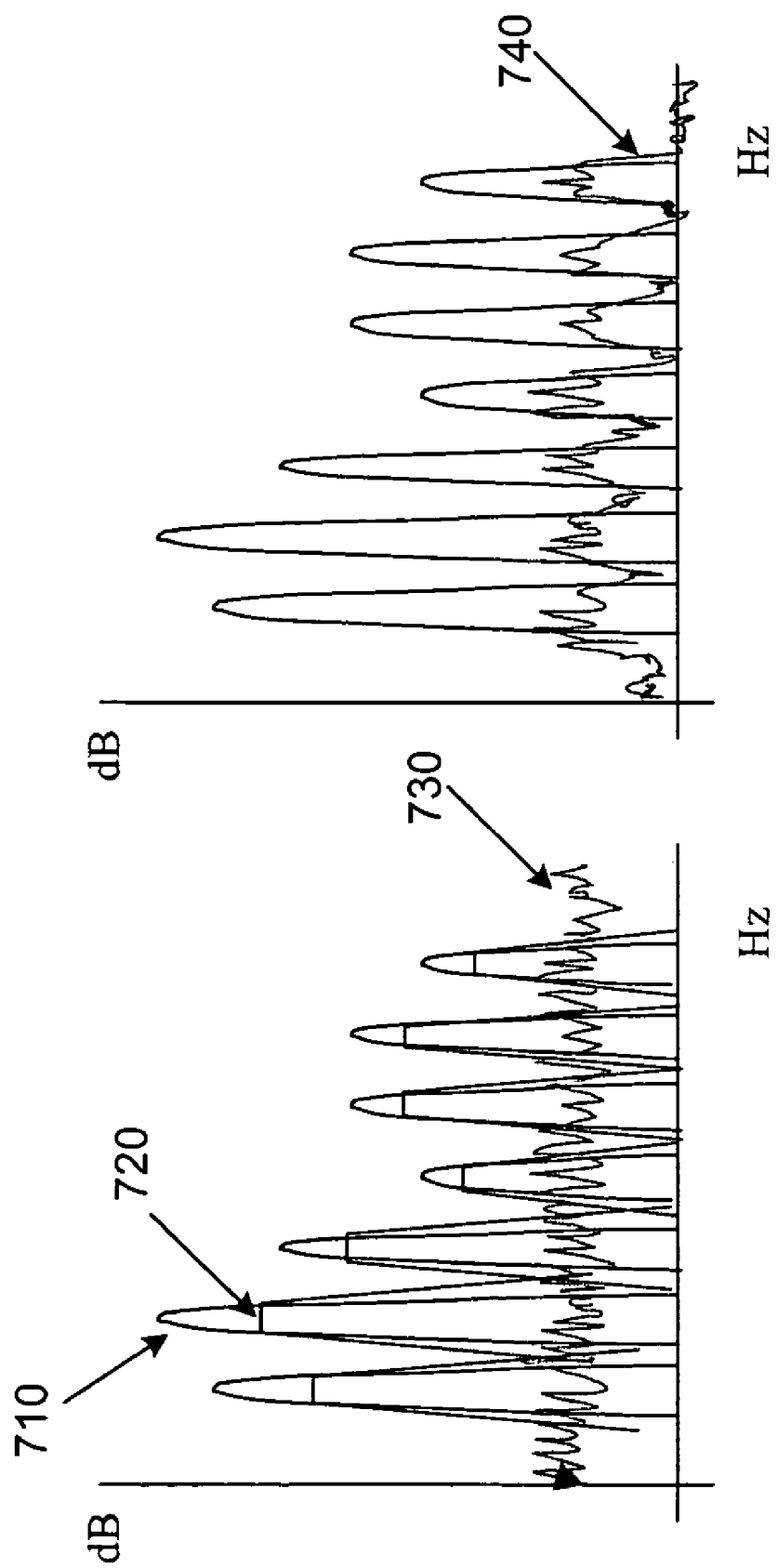
FIG. 7 illustrates an operation graph based on the echo canceller of FIG. 3.

In another embodiment, however, the spectral subtraction can be performed using the estimation of the frequency-masking threshold created by the near-end talker spectrum and attenuation of the inter-harmonics bins at a level below the masking threshold, which allows the masking objective by minimizing the distortions introduced by the noise suppression. During segment B 620 and segment C 630, where the near-end is not active, the spectral subtraction lowers the level of the signal to a tunable level of –N dB, which reduces the background noise level and increases the listener comfort. During echo only segment C 630, the spectrum of the attenuated signal can be replaced with a spectral model of the background noise attenuated by N dB. FIG. 7 illustrates the effect of operation of the above-described technique reference 710 denotes FFT of TxFiltered (n), reference 720 denotes a frequency-masking threshold, reference 730 denotes residual echo before spectral noise suppression, and reference 740 denotes residual echo after spectral noise suppression.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of masking a residual echo signal by an echo canceller, said method comprising:
    receiving a far-end signal;
    adjusting filter coefficients of an adaptive filter in response to said far-end signal;
    generating an echo model signal based on said far-end signal using said adaptive filter;
    receiving a near-end signal;
    subtracting said echo model signal from said near-end signal to generate an output signal;
    defining a spectral mask based on said near-end signal, wherein said spectral mask is indicative of near-end spectral peaks and near-end spectral valleys;
    de-emphasizing said output signal in spectral regions of said neat-end spectral peaks, using a weighted filter based on medium term spectral characteristics of said near-end signal; and
    emphasizing said output signal in spectral regions of said near-end spectral valleys.

2. The method of claim 1, wherein an inverse of said weighted filter generates a signal that is correlated with said medium term spectral characteristics of said near-end signal.

3. The method of claim 1, wherein said medium term spectral characteristics of said near-end signal are estimated in absence of echo.

4. The method of claim 1 further comprises applying a spectral post-processing to said output signal to decrease or remove choppiness.

5. An echo cancellation system for masking a residual echo signal, said echo cancellation system comprising:
    a far-end receiver configured to receive a far-end signal;
    an adaptive filter configured to adjust filter coefficients in response to said far-end signal, said adaptive filter further configured to generate an echo model signal based on said far-end signal;
    a near-end receiver configured to receive a near-end signal;
    a subtractor configured to subtract said echo model signal from said near-end signal to generate an output signal; and
    a mask generator configured to define a spectral mask based on said near-end signal, wherein said spectral mask is indicative of near-end spectral peaks and near-end spectral valley, and wherein said mask generator is further configured to de-emphasize said output signal in spectral regions of said near-end spectral peaks and to emphasize said output signal in spectral regions of said near-end spectral valleys, wherein said mask generator includes a weighted filter, and wherein said weighted filter de-emphasizes said output signal in spectral regions of said near-end spectral peaks and emphasizes said output signal in spectral regions of said near-end spectral valleys, wherein said weighted filter uses medium term spectral characteristics of said near-end signal.

6. The echo cancellation system of claim 5, wherein an inverse of said weighted filter generates a signal that is correlated with said medium term spectral characteristics of said near-end signal.

7. The echo cancellation system of claim 5, wherein said medium term spectral characteristics of said near-end signal are estimated in absence of echo.

8. The echo cancellation system of claim 5 further comprises a spectral post-processor configured to apply a spectral post-processing to said output signal to decrease or remove choppiness.

9. A computer program stored in a computer-readable medium for execution by an echo cancellation system for masking a residual echo signal, said computer program comprising:

code for receiving a far-end signal;

code for adjusting filter coefficients of an adaptive filter in response to said far-end signal;

code for generating an echo model signal based on said far-end signal using said adaptive filter;

code for receiving a near-end signal;

code for subtracting said echo model signal from said near-end signal to generate an output signal;

code for defining a spectral mask based on said near-end signal, wherein said spectral mask is indicative of near-end spectral peaks and near-end spectral valleys;

code for de-emphasizing said output signal in spectral regions of said near-end spectral peaks, using a weighted filter based on medium term spectral characteristics of said near-end signal; and code for emphasizing said output signal in spectral regions of said near-end spectral valleys.

10. The computer program of claim 9, wherein said medium term spectral characteristics of said near-end signal are estimated in absence of echo.

11. The computer program of claim 9 further comprises code for applying a spectral post-processing to said output signal to decrease or remove choppiness.

\* \* \* \* \*

UNITED STATES PATENT AND TRADEMARK OFFICE
CERTIFICATE OF CORRECTION

| | | |
|---|---|---|
| PATENT NO. | : 7,711,107 B1 | Page 1 of 1 |
| APPLICATION NO. | : 11/129450 | |
| DATED | : May 4, 2010 | |
| INVENTOR(S) | : Murgia et al. | |

It is certified that error appears in the above-identified patent and that said Letters Patent is hereby corrected as shown below:

In the claims, column 8, line 31, "neat-end" should be changed to --near-end--.

Signed and Sealed this

Nineteenth Day of October, 2010

David J. Kappos
*Director of the United States Patent and Trademark Office*